United States Patent [19]

Fontaine

[11] Patent Number: 4,667,718

[45] Date of Patent: May 26, 1987

[54] PNEUMATIC TIRE TREAD

[75] Inventor: Jean F. L. Fontaine, Buerden, Luxembourg

[73] Assignee: The Goodyear Tire & Rubber Company, Akron, Ohio

[21] Appl. No.: 746,907

[22] Filed: Jun. 20, 1985

[30] Foreign Application Priority Data

Feb. 26, 1985 [EP] European Pat. Off. ........ 85630026.4

[51] Int. Cl.⁴ .............................................. B60C 11/11
[52] U.S. Cl. ............................ 152/209 R; 152/209 D
[58] Field of Search ....... 152/209 R, 209 D, 209 NT, 152/209 WT

[56]  References Cited

U.S. PATENT DOCUMENTS

| D. 157,953 | 4/1950 | Hawkinson | D90/20 |
|---|---|---|---|
| 1,254,050 | 1/1918 | MacBeth | 152/209 R |
| 1,956,011 | 4/1934 | Evans | 152/14 |
| 2,505,137 | 4/1950 | Nellen | 152/209 R |
| 2,878,852 | 3/1959 | Lippmann et al. | 152/209 R |
| 3,437,120 | 4/1969 | Verdier | 152/209 R |
| 3,705,613 | 12/1972 | Verdier | 152/209 R |
| 3,805,865 | 4/1974 | Price | 152/209 R |
| 3,842,879 | 10/1974 | Mills et al. | 152/209 R |
| 3,951,191 | 4/1976 | Suzuki et al. | 152/209 R |
| 3,986,545 | 10/1976 | Montagne | 152/209 |
| 4,327,792 | 5/1982 | Landers | 152/209 R |
| 4,337,813 | 7/1982 | Rach et al. | 152/209 R |
| 4,424,846 | 1/1984 | Seitz et al. | 152/209 R |

FOREIGN PATENT DOCUMENTS

| 0088873 | 2/1983 | European Pat. Off. . | |
| 2455044 | 6/1975 | Fed. Rep. of Germany . | |
| 2854364 | 6/1979 | Fed. Rep. of Germany . | |
| 2496562 | 6/1982 | France | 152/209 D |

Primary Examiner—Donald E. Czaja
Assistant Examiner—Ramon R. Hoch
Attorney, Agent, or Firm—L. R. Drayer; Ronald E. Larson

[57]  ABSTRACT

A pneumatic tire (10) has a tread portion (11) which comprises a plurality of independent block elements. The block elements (17A, 17B and 17C) can vary in size having different circumferential lengths and axial widths. The block elements are arranged in rows (18A, 18B, and 18C) extending across the tread and each row comprises block elements having substantially the same circumferential length. The rows preferably contain different numbers of block elements such that a multiple of the circumferential length of the block elements in any row times the number of elements in that row is essentially a constant.

14 Claims, 5 Drawing Figures

PNEUMATIC TIRE TREAD

This invention relates to pneumatic tires for motor vehicles, and in particular to tires for passenger cars.

As a motor vehicle travels over a road surface the rotating tires of the vehicle generate tire noise. Noise is generated primarily by interaction of the tire tread with the road surface and the amount of noise can differ greatly from tread pattern to tread pattern depending upon certain features related to the tread pattern.

One well known means in the industry to reduce objectionable tire noise is to spread the noise over a wide frequency spectrum. This is done by varying the circumferential pitch length of the repetitive tread pattern design elements around the tire. For example, it is common to have at least three differing pitch lengths for the design elements, and also to mix the differing pitch lengths designs elements in a non-uniform manner.

Such a solution is shown in U.S. Pat. No. 1,956,011. U.S. Design No. 157,953 also illustrates a pneumatic tire comprising a ground contacting tread portion having a pair of lateral edges, the tread portion having a plurality of independent block elements which can vary in axial width and circumferential length, said block elements being disposed in substantially parallel rows which extend between circumferential planes and each row comprising elements having substantially the same circumferential length, there being a plurality of differing rows having different numbers of block elements therein. Such a tire will hereinafter be called a tire of the kind referred.

However, even using such techniques some tread patterns still produce an unacceptable amount of tread noise. It is the object of the present invention to provide a new tire having a tread portion which will spread the noise generation over a wider frequency range and therefore make the noise less objectionable to the listener.

The present invention relates to a tire of the kind referred characterized in that a multiple of the circumferential length of a block element in a respective row times the number of block elements in that row is substantially a constant.

A "circumferential plane" is a plane perpendicular to the axis of rotation of the tire.

By "axial" or "axially" is meant displacements along the axis of rotation of the tire, and by "circumferential" or "circumferentially" is meant displacements in the direction of rotation of the tire.

By a "constant" is meant that the multiples of the block element length for any given row times the number of elements in that row should not vary between the rows from the arithmetic average of such multiples by more than 10%.

Preferably the block elements are formed in parallel rows that extend diagonally across the tread portion making an angle of no more than 80° with the mid-circumferential plane of the tire, and more preferably an angle of between 45° and 60°.

Also, the tread portion could include at least one circumferential rib, and a second plurality of block elements which are separated from the above first mentioned block elements by said circumferential rib.

Conveniently the second plurality of block elements is substantially identical with the first mentioned block elements, and the second block elements are arranged in rows inclined oppositely to the inclination of the rows of first mentioned block elements.

The invention will be described by way of example and with reference to the accompanying drawings in which.

Figure 1:
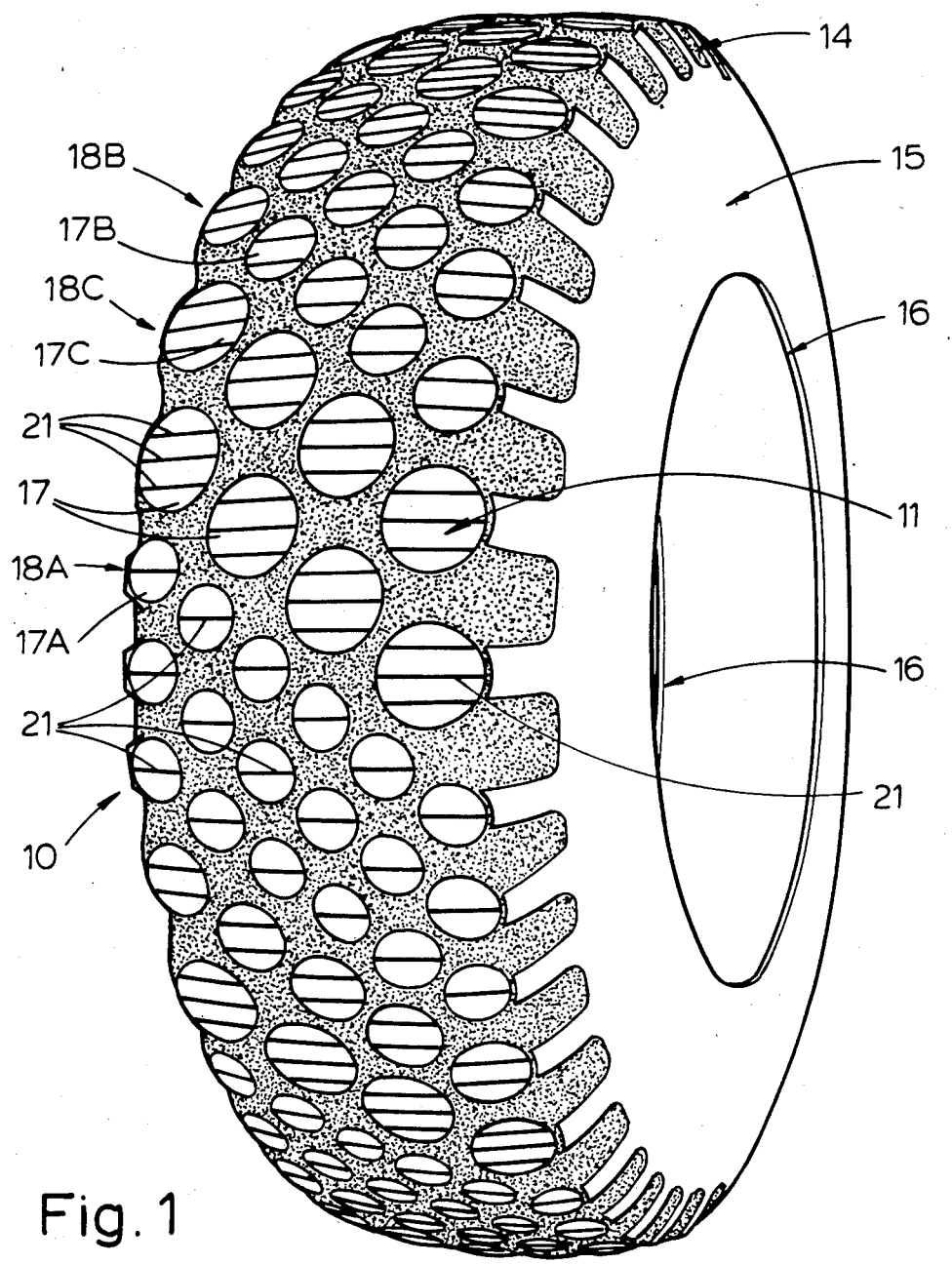
FIG. 1 is a perspective view of a tire according to a first embodiment of the invention.
Figure 2:
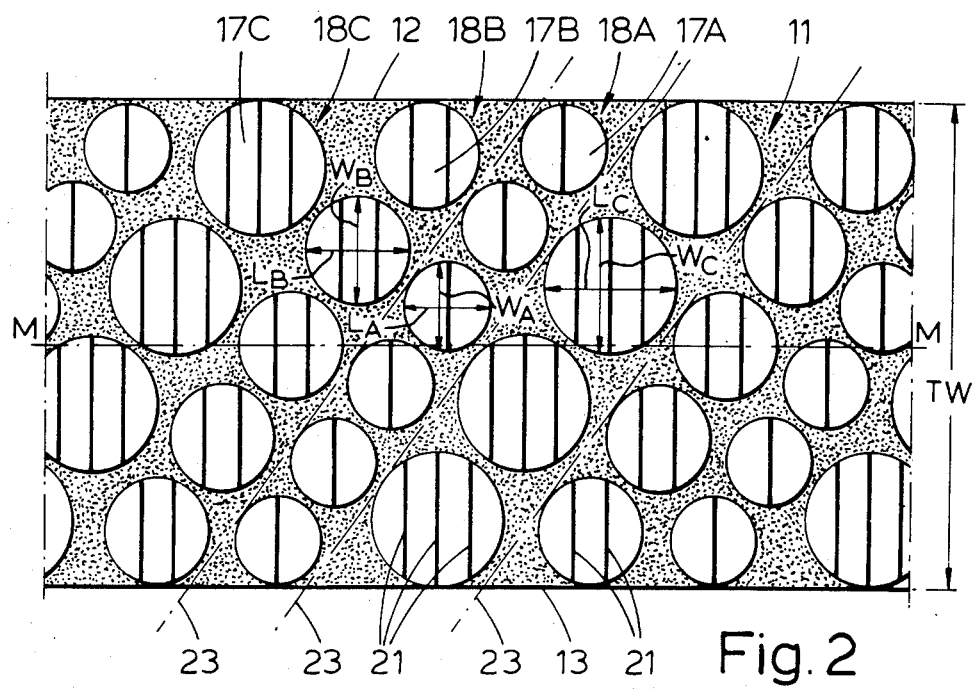
FIG. 2 is a fragmentary plan view of the tread portion of the tire illustrated in FIG. 1, in which the rows of block elements are arranged in a particular sequence.

With reference to FIGS. 1 and 2, there is illustrated a pneumatic tire 10 for a passenger car which has a radial carcass construction. The tire 10 comprises a ground contacting tread portion 11 having a pair of lateral edges 12 and 13 which are each flanked by a shoulder region 14. Each shoulder region 14 extends radially inwardly into a sidewall 15, and each sidewall 15 terminates at its radially inner end in a bead portion 16 utilized for fitting the tire onto a wheel rim.

The tread portion 11 consists of a plurality of independent block elements 17 of substantially the same geometric shape but differing in size. In this example the block elements 17 are substantially circular and are arranged in rows which extend across the tread portion 11 between two circumferential planes, that is planes normal to the axis of rotation of the line, which are located at the lateral edges 12 and 13. Each block element 17 has at least one sipe 21 (sometimes called a blade) therein, which extend axially across the respective element. The lateral edges 12 and 13 are separated by an axial distance TW, known as the tread width. For the purpose of this invention, the tread width TW is defined as the greatest axial distance across the tread, when measured from the footprint of the tire when inflated to a design pressure and subjected to a design load. There are three different size block elements 17A, 17B, and 17C which are arranged in rows 18A, 18B, and 18C respectively, there being only one size of block elements in each row. The elements 17A, 17B, and 17C have different numbers of sipes 21 therein, these are one, two and three sipes respectively, as the size of the block elements increases. Furthermore, the rows 18A, 18B, and 18C have differing numbers of block elements 17A, 17B, and 17C therein and each row 18A, 18B, or 18C, consists of block elements that are substantially identical and that have the same axial width and circumferential length.

The number of block elements in each of the rows 18A, 18B, and 18C could range between three block elements and nine block elements. However, it is preferable for the numbers of block elements in the three rows to vary by no more than two.

Hence, the row 18A consists of six substantially identical block elements 17A that each have the same axial width $W_A$ and the same circumferential length $L_A$, the row 18B consists of five substantially identical block elements 17B that each have the same axial width $W_B$ and circumferential length $L_B$, and the row 18C consists of four substantially identical block elements 17C each having the same axial width $W_C$ and circumferential length $L_C$.

The circumferential lengths $L_A$, $L_B$, and $L_C$ for the block elements 17A, 17B, and 17C respectively are such that for any given row 18A, 18B, or 18C the multiple of the circumferential length of the block elements in that row times the number of block elements in the respective row is substantially constant.

For example, see the following table:

TABLE 1

| Row | Block Element | Length of element in Terms of TW (L) | No. of elements per row (N) | L × N |
|---|---|---|---|---|
| 18A | 17A | 0.165 TW | 6 | 0.993 TW |
| 18B | 17B | 0.198 TW | 5 | 0.993 TW |
| 18C | 17C | 0.251 TW | 4 | 1.006 TW |

Thus it can be seen that for all the rows the multiple LN is substantially constant and is equal to 1.0 TW±1%.

The rows 18A, 18B, and 18C of block elements are substantially parallel with each other and extend diagonally across the tread portion. The rows are separated from each other by diagonally extending grooves 23, shown by dotted lines in FIG. 2. These grooves 23 make an angle $\alpha$ with the mid-circumferential plane M—M of the tire. For the purpose of this invention the mid-circumferential plane is a plane located midway between the lateral edges 12 and 13 of the tread portion and which extends normally of the axis of rotation of the tire. The angle $\alpha$ is not greater than 80° and is more preferably in the range of 45° and 65°, and in this particular embodiment is approximately 55°.

As shown in FIG. 2 the circumferential sequence of the rows of block elements can be arranged so that the different rows 18A, 18B, and 18C each have a number of block elements 17A, 17B, or 17C respectively in a given row, that differs from the number of block elements in the adjacent rows on each side of the given row. Whereas in FIG. 1, it can be seen that the rows of block elements can be randomly mixed, so that for any given row the number of block elements in that row may be the same as the adjacent rows on each side thereof, or could differ from the number of block elements in one of the adjacent rows, or as in FIG. 2 could differ with the number of block elements in the adjacent rows on both sides thereof.

How the rows 18A, 18B, and 18C are mixed can depend upon such factors as ease of tire mold manufacture, and tire noise spectrum.

Figure 3:
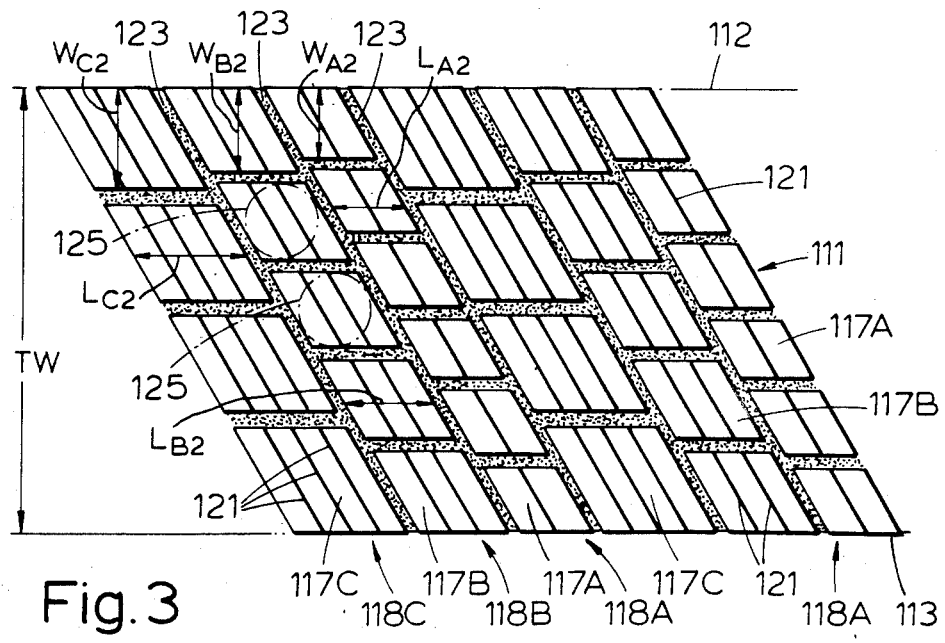
FIG. 3 is a fragmentary plan view of the tread portion of a tire according to a second embodiment of the invention.

With reference to FIG. 3, there is illustrated a tread portion 111 of a tire according to a second embodiment of the invention. The tread is similar to that illustrated in FIGS. 1 and 2 and comprises a plurality of independent block elements of substantially the same geometric shape, in this example the block elements 117A, 117B and 117C are in the form of parallelograms, and are preferably rhomboid. The elements again consist of three differing types of elements 117A, 117B, and 117C which are located in their respective rows 118A, 118B, and 118C. The three different block elements 117A, 117B, and 117C have different circumferential lengths $L_{A2}$, $L_{B2}$, and $L_{C2}$ respectively, and also differing axial widths $W_{A2}$, $W_{B2}$, and $W_{C2}$ respectively. As illustrated, the block elements in any one row have the same lengths and widths. These rows 118A, 118B, and 118C extend diagonally across the tread portion 111 between the lateral edges 112 and 113 and are separated by parallel grooves 123 extending diagonally across the tread portion 111, at an angle of about 60° relative to the mid-circumferential plane. The circumferential lengths $L_{A2}$, $L_{B2}$, and $L_{C2}$ of the respective block elements 117A, 117B, and 117C are measured as illustrated in FIG. 3, but a related measurement could be taken in a direction normal to the groove 123 since this is related to the true circumferential length by a sine function of the angle, of inclination of the rows of block elements to the mid-circumferential plane. As before, from Table 2 below, it can be seen that the multiple of the circumferential lengths of the block elements in any row 118A, 118B, or 118C times the number of block elements in the respective row is a constant.

TABLE 2

| Row | Block Element | Length of Element in terms of TW (L) | No. of Elements per row (N) | N × L |
|---|---|---|---|---|
| 118A | 117A | 0.169 | 6 | 1.01 TW |
| 118B | 117B | 0.209 | 5 | 1.05 TW |
| 118C | 117C | 0.258 | 4 | 1.03 TW |

Thus it can be seen that for all rows the multiple LN is substantially constant and is again substantially equal to the treadwidth TW.

As described with reference to FIG. 1, the block elements 117A, 117B, and 117C have sipes 121 therein, these being an increasing number of sipes from 1 to 3 as the size of the block elements increases.

As a variation on the tread portion illustrated it is envisaged that it could be possible for some of the rhomboid block elements to be replaced by circular elements 125 as illustrated in FIG. 1, as long as the circular element fitted within the overall shape of the rhomboid it replaced (see dotted outline in FIG. 3), so that the circular elements have the same circumferential length as the rhomboid elements.

Figure 4:
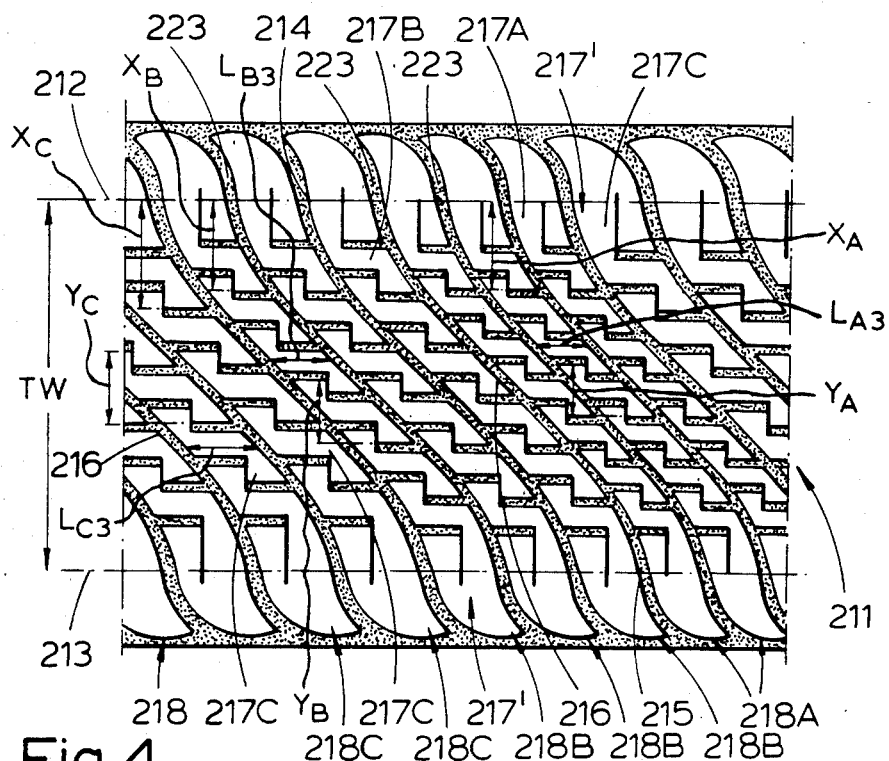
FIG. 4 is a fragmentary plan view of a tread pattern of a third embodiment of the invention; and, FIG. 5 is a fragmentary plan view of another embodiment of the invention.

With reference now to FIG. 4, there is illustrated a third embodiment of the invention in which, a plurality of independent block elements are arranged in rows across the tread portion 211. The block elements all have substantially the same geometric shape, in this case the block elements are "S" shaped. The block elements are divided into rows 218 by substantially parallel lateral grooves 223 which extend across the tread portion 211 from one lateral edge 212 to the other lateral edge 213. The grooves 223 have the form of an elongated "S" comprising curved portions 214, 215 adjacent the lateral edges 212, 213, and a straight central portion 216 extending diagonally across the tread portion at an angle of about 45°, with the mid-circumferential plane.

The block elements 217 are formed basically as elements having three different circumferential lengths, a smaller element 217A, a medium length element 217B, and a large element 217C. Each row 218 containing only block elements of one circumferential length, hence the rows 218A contain only seven smaller block elements 217A, rows 218B contain only six medium length elements 218B, and the rows 218C contain only five longer elements 217C.

As previously described for the embodiments shown in FIGS. 1, 2, and 3, the circumferential lengths of the block elements, or the sine related distance between adjacent lateral grooves 223 as measured normal to the direction of the groove, times the number of block elements in the respective row is a constant. The respective circumferential length $L_{A3}$, $L_{B3}$, $L_{3C}$ of the block elements 217 are shown in FIG. 3 and again if these are multiplied by the number of block elements it will be seen that the multiple LN is substantially constant and is equal to 1.0 TW±5%.

It can be seen that the block elements 217' adjacent the lateral edges 212, 213 have a greater axial width than the other block elements in their respective row. The axial widths of the outer block elements 217' in the row 218A, 218B, 218C are designated $X_A$, $X_B$, and $X_C$ respectively. For the row 218A, the axial width $X_A$ of the outer block elements 217' is approximately 1.6 times the axial width $Y_A$ of the inner elements 217A, for the row 218B the axial widths $Y_B$ of the inner block elements 217B, and for the row 218C the axial widths $X_C$ of the outer elements is approximately 1.25 times the axial width $Y_C$ of the inner block elements 217C.

Thus it can be seen that the axial widths of the block elements 217 in any given row 218 can vary. Preferably, no block element should have an axial width which is more than twice the axial width of any other block elements in that row.

Figure 5:
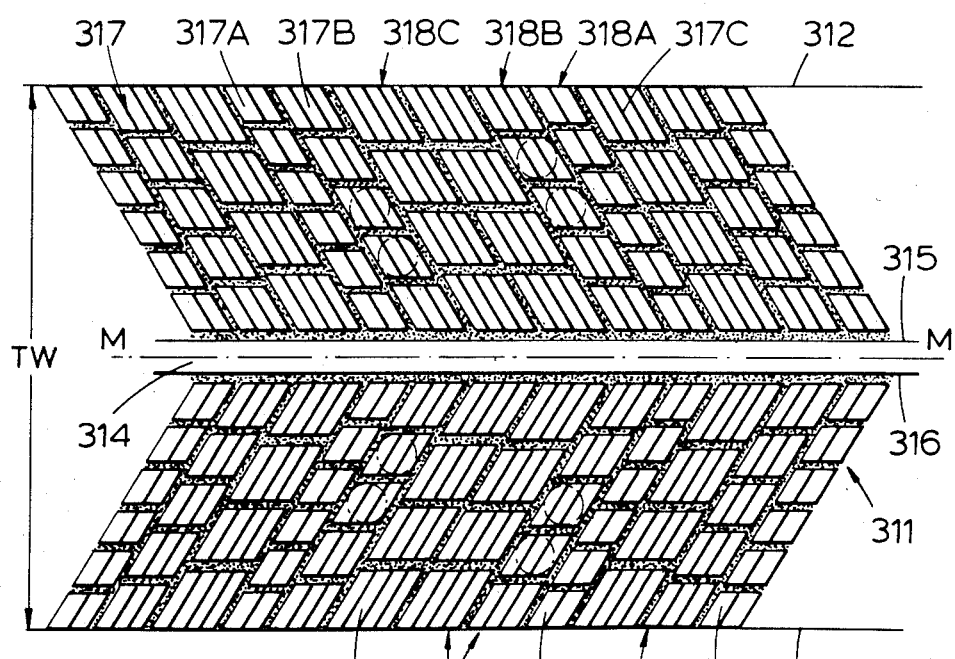

With reference now to FIG. 5, there is illustrated another embodiment of the invention in which the tread portion 311, extending between two lateral edges 312, 313 includes two pluralities of block elements, a first plurality of block elements 317 arranged in rows on one side of the mid circumferential plane M—M, and a second plurality of block element 327 arranged on the other side of the mid circumferential plane M—M. In this example the first plurality of block element 317 is identical in that it mirror images the second plurality of block elements 327. However, it is envisaged that in certain asymmetrical designs it may be desirable for the two pluralities of block elements to differ one from the other.

The first plurality of block elements 317 are arranged in rows 318A, 318B, and 318C extending diagonally across the tread portion 311, and the second plurality of block elements 327 are arranged in rows 328 which also extend diagonally across the tread portion, preferably but not necessarily in the opposite inclination as compared with the rows 318A, 318B, and 318C of the first plurality of block elements 317, thereby forming a so-called "directional" tread pattern.

The rows of the first plurality of block elements 317 could meet with the rows of the second plurality of block elements 327 at the mid-circumferential plane M—M, or alternatively as illustrated the two pluralities of block elements 317 and 327 can be separated by at least one circumferential rib 314 located symmetrically about the mid-circumferential plane M—M.

The previously described relationship between the circumferential length of a block element and the number of block elements in the respective row, is as before, when applied separately to each plurality of elements. Thus the rows 318A, 318B, and 318C of the first plurality of block element 317 extend between two circumferential planes, the first of which is located at the lateral edge 312 and the second of which is located at the circumferentially extending edge 315 of the rib 314. As for the embodiment of FIG. 3, the block elements 317 are arranged so that the different size elements 317A, 317B, and 317C are located in their respective rows 318A, 318B, and 318C.

The number of block elements in each respective row times the circumferential length of the block elements in that row is substantially constant. In this particular case since the rows do not extend across the whole tread width the constant is not equal to the tread width TW but is approximately TW/2 ±10%. TW/2±10%.

Similarly, the second plurality of block elements 327 is arranged in rows 328 extending between two other circumferential planes located one at the lateral edge 313 and the other at the circumferential extending edge 316 of the rib 314. Since the two pluralities of block elements are substantially identical the arrangement of the second set of block elements 327 is as described above.

What is claimed is:

1. A pneumatic tire comprising a ground contacting tread portion with a plurality of independent block elements, said block elements being disposed in substantially parallel rows which extend between circumferential planes, at least a portion of each row extending diagonally across the tread portion at an angle of not greater than 80° with respect to the mid-circumferential plane of the tire, each row comprising elements having substantially the same circumferential length but not all of the block elements of said tread have the same circumferential length, there being a plurality of differing rows having different numbers of block elements therein, and throughout said tread portion for any given row the multiple of the circumferential length of a block element in that row times the number of block elements in that row is substantially constant.

2. A pneumatic tire as claimed in claim 1 wherein said circumferential planes are disposed at the lateral edges of the tread.

3. A pneumatic tire as claimed in claim 1 wherein all of the block elements in a given row have substantially the same axial width.

4. A pneumatic tire as claimed in claim 2 wherein all of the block elements in a given row have substantially the same axial width.

5. A pneumatic tire as claimed in claim 1 wherein all of the block elements have a substantially similar geometric shape.

6. A pneumatic tire as claimed in claim 2 wherein all of the block elements have a substantially similar geometric shape.

7. A pneumatic tire as claimed in claim 3 wherein all of the block elements have a substantially similar geometric shape.

8. A pneumatic tire as claimed in claim 4 wherein all of the block elements have a substantially similar geometric shape.

9. A pneumatic tire as claimed in any one of claims 1 through 8 wherein the number of block elements in a row differs from the number of block elements in at least one of the adjacent rows.

10. A pneumatic tire as claimed in claim 9 wherein the number of block elements in a row differs from the number of block elements in both of the next adjacent rows of block elements.

11. A pneumatic tire as claimed in any one of claims 1, 2, 5, 6, 7 or 8 wherein the block elements in any given row vary in axial width, and no block elements in a given row has more than twice the axial width of any other block elements in that row.

12. A pneumatic tire as described in claim 1 wherein said parallel rows are arranged in a curved configuration.

13. A pneumatic tire as claimed in claim 1 wherein said tread portion further comprises a circumferential rib and a second plurality of block elements disposed in rows in the manner described in claim 1, said rib separating the two pluralities of block elements from one another.

14. A pneumatic tire as claimed in any one of claims 1 through 8 wherein each block element has at least one sipe therein, the number of sipes in a block element increasing as the size of the block elements increases.

* * * * *